Nov. 28, 1944.                DE WITT CLAUSEN                2,363,831

MILLING MACHINE

Filed Oct. 26, 1942

INVENTOR
DeWitt Clausen
BY Parker, Carlson, Pitney & Hubbard
ATTORNEYS

Patented Nov. 28, 1944

2,363,831

UNITED STATES PATENT OFFICE 2,363,831

MILLING MACHINE

De Witt Clausen, Chicago, Ill., assignor to Lucien I. Yeomans, Inc., Chicago, Ill., a corporation of Illinois Application October 26, 1942, Serial No. 463,312

6 Claims. (Cl. 90—20.5)

This invention relates to milling machines and more particularly to the manner of mounting the cutter arbors thereof. In practice, such an arbor is usually supported at its inner end on the driving spindle and at its other end by a bearing in the outer end of the overarm. This leaves unsupported substantial lengths of the arbor between the cutter and the arbor bearings and renders the arbor subject to lateral deflection with a consequent inaccuracy in the work surface produced.

The general object of the present invention is to reduce the possibility of such inaccuracy through the provision of rigid and accurately located bearing supports intermediate the cutter and the overarm bearings.

Another object is to provide auxiliary arbor supports constructed and arranged in a novel manner to permit ready removal and replacement of the cutter arbor.

Figure 1:
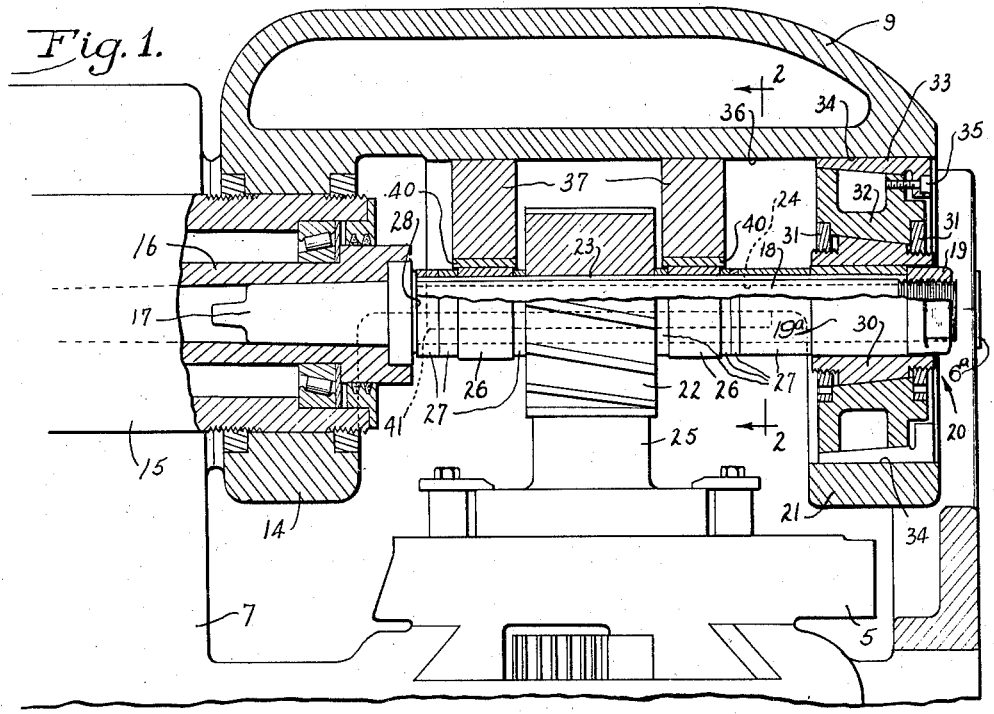

Other objects and advantages of the invention will become apparent from the following detailed description taken in connection with the accompanying drawing, in which Figure 1 is a fragmentary end elevation of an overarm type of milling machine embodying the present invention, the overarm and the bearings carried thereby being shown in vertical diametrical section.

Figure 2:
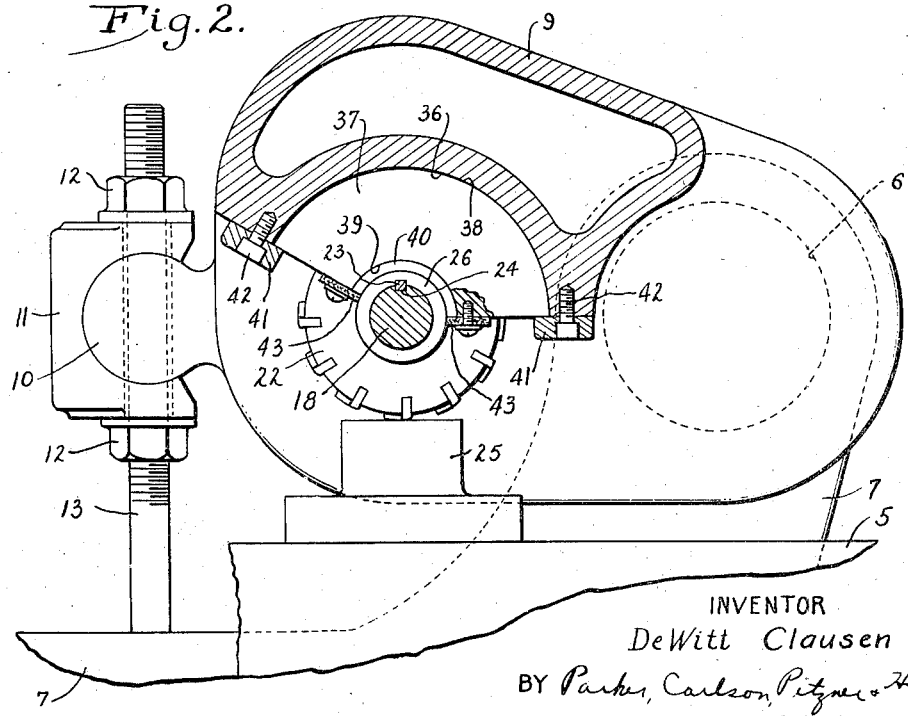

Fig. 2 is a section taken along the line 2—2 of Fig. 1.

While the invention is susceptible of various modifications and alternative constructions, I have shown in the drawing and will herein describe in detail the preferred embodiment. It is to be understood, however, that I do not intend to limit the invention by such disclosure, but aim to cover all modifications and alternative constructions falling within the spirit and scope of the invention as expressed in the appended claims.

In the drawing, the invention is shown, for purposes of illustration, in a milling machine having a work table 5 slidable horizontally along ways on a frame structure 7 which supports a horizontal overarm 9 disposed above and projecting across the table. To provide for vertical adjustment of the cutter relative to the table, the arm 9 is hinged at its inner end on a horizontal pivot 6 and at its outer end on a pivot 6a, both pivots being carried by the frame structure 7. The arm is connected at 10 to a fitting 11 which is held in position by nuts 12 threading onto a vertical rod 13 on the frame. By adjusting the nuts, the overarm and cutter may be swung upwardly or downwardly about the pivots 6 and 6a.

The inner end 14 of the overarm supports a sleeve 15 in which is journaled a power driven spindle 16 recessed at its end to receive the tapered shank 17 of a cutter arbor 18.

A collar 19a is held by a nut 19 on the outer end of the arbor and is removably journaled in a bearing 20 which is supported removably in the downwardly hanging end 21 of the overarm. Preferably, the cutter 22 is secured to the arbor by a key 23 seating in an arbor slot 24 and permitting of axial adjustment of the cutter according to the location of the work 25 to be milled. The axial position of the cutter is maintained by spacers or collars 26 and 27 of the proper thickness filling the spaces between the cutter, a shoulder 28 on the arbor, and the collar 19a. The collars 19a and 26 are keyed to the arbor so as to rotate therewith.

The bearing 20 comprises a ring 30 receiving the collar 19a with a close running fit and clamped by nuts 31 to a ring 32 which supports a split ring 33 expanded within a cylindrical surface 34 which is formed in the outer end 21 of the overarm and accurately located concentric with the axis of the arbor. The expansion may be effected by tightening screws 35 threading into the ring 33. By loosening these screws, the entire bearing 20 may be slid endwise off from the arbor and removed from the cylindrical supporting surface 34.

Substantially throughout its length, the overarm is bored to the same radius as the cylindrical surface 34 so as to form a partial cylindrical surface 36 facing downwardly and located exactly concentric with the arbor axis. This surface merges with the surface 34 and constitutes a seat for a pair of arcuate partial bearing members 37 having outer surfaces 38 which fit accurately in the seat. Sweated to inner surfaces 39 on the members 37 are partial bushings 40 that bear downwardly against the arbor collars 26 so as to provide areas of lateral support disposed closely adjacent and on opposite sides of the cutter. These hold the arbor against upward deflection under the forces applied thereto during a milling operation.

The members 37 are adjustable axially along the seat 36 so that they may function in any position in which the cutter may be disposed. After adjustment to the desired position, the members 37 are clamped against the seat by bars 41 underlying the ends of the members 37 and held by screws 42 against the edges of the overarm, the bars extending throughout the length of the seat 36. Wiper strips 43 secured to the members 37 bear against the arbor collars 26 and exclude chips and dirt from the bushing surfaces.

The auxiliary arbor supports constructed and mounted in the manner above described permit of convenient removal and replacement of the cutter. To accomplish this, the clamping bars 41 are loosened and the entire bearing 20 is removed from the overarm after loosening the screws 35. The first auxiliary supporting member 37 may then be slid along the seat 36 and removed through the cylindrical surface 34, thereby permitting withdrawal of the arbor along with the other member 37.

It will be observed that the auxiliary bearing supports 37 increase substantially the rigidity of the cutter mounting in all positions of cutter adjustment without in any way interfering with the adjustment or replacement of the cutter. Since the auxiliary bearing surfaces extend only partially around the arbor, they may be located close to the cutter without possible interference with the work.

I claim as my invention:

1. A mounting for the cutter arbor of a milling machine having, in combination, a rotary drive spindle for rotatably supporting one end of said arbor, an overarm having a partial cylindrical bearing surface intermediate its ends and an open-ended cylindrical bearing surface at its outer end, said bearing surfaces being of the same diameter and concentric with the axis of said spindle, a bearing support removably received in said cylindrical bearing surface and rotatably supporting the outer end of said arbor, a pair of arcuate members seated in said partial cylindrical bearing surface and having surfaces bearing against and extending partially around said arbor, and means for clamping said members against said partial cylindrical bearing surface, said arcuate members being removable from said overarm by endwise movement along the partial cylindrical bearing surface after removal of said bearing support.

2. A mounting for the cutter arbor of a milling machine having, in combination, a rotary drive spindle for rotatably supporting one end of said arbor, an overarm having a partial cylindrical bearing surface concentric with said spindle axis, a pair of arcuate members seated in said bearing surface and having surfaces bearing against and extending partially around said arbor, means for clamping said members against said bearing surface in different positions of axial adjustment of the members, and a bearing supporting the outer end of said arbor and removably mounted in the outer end of said overarm to permit of endwise removal of said members from said overarm.

3. A mounting for the cutter arbor of a milling machine having, in combination, a horizontal drive spindle adapted to support one end of said arbor, an arm overlying said arbor, a bearing mounted in the outer end of said arm and rotatably supporting the other end of said arbor, a downwardly facing partial cylindrical bearing surface formed intermediate the ends of said arm and concentric with the axis of said arbor, arcuate members seated in said bearing surface and having downwardly facing partial bearing surfaces partially enclosing said arbor and bearing downwardly against the latter to prevent upward deflection thereof, and means clamping said members detachably in their seat to permit adjustment of the members endwise of said arbor.

4. A mounting for the cutter arbor of a milling machine having, in combination, means for rotatably supporting said arbor, an overarm having a partial cylindrical bearing surface intermediate its ends and an open-ended cylindrical bearing surface at its outer end, said bearing surfaces being of the same diameter and concentric with the axis of said spindle, a bearing support removably received in said cylindrical bearing surface and rotatably supporting the outer end of said arbor, a pair of members seated in said partial cylindrical bearing surface and having surfaces bearing against said arbor, and means for clamping said members against said partial cylindrical bearing surface, said members being removable from said overarm by endwise movement along the partial cylindrical bearing surface after removal of said bearing support.

5. A mounting for the cutter arbor of a milling machine having, in combination, a rotary drive spindle for rotatably supporting one end of said arbor, an overarm having a partial cylindrical bearing surface concentric with said spindle axis, a member seated in said bearing surface and having a surface bearing against said arbor, means for clamping said member against said bearing surface in different positions of axial adjustment of the member, and a bearing supporting the outer end of said arbor and removably mounted in the outer end of said overarm to permit of endwise removal of said member from said overarm.

6. The combination with a milling machine having a frame of, means on said frame adapted to support one end of a cutter arbor, an overarm projecting rigidly from said frame along the axis of said arbor and having an elongated concave seat facing said arbor and concentric with the axis thereof, and a member having concentric convex and concave surfaces, said convex surface fitting in and being adjustable along said concave seat, and said concave surface being adapted to bear against the periphery of said arbor.

DE WITT CLAUSEN.